United States Patent

[11] 3,607,920

| [72] | Inventor | Allan Pennington Clark |
| | | Camillus, N.Y. |
| [21] | Appl. No. | 676,932 |
| [22] | Filed | Oct. 20, 1967 |
| [45] | Patented | Sept. 21, 1971 |
| [73] | Assignee | Cowles Chemical Company |
| | | Cleveland, Ohio |

[54] PROCESS FOR THE PREPARATION OF HIGH PURITY ISOMERS OF TOLUIC ACID
6 Claims, 1 Drawing Fig.

[52] U.S. Cl..................................... 260/524 R,
260/525
[51] Int. Cl...................................... C07c 51/42,
C07c 63/02
[50] Field of Search........................... 260/524,
525, 534 G

[56] References Cited
UNITED STATES PATENTS

| 2,887,511 | 5/1959 | Wasley............ | 260/525 |
| 3,381,033 | 4/1968 | Grier et al........ | 260/534 |
| 2,128,323 | 8/1938 | Rogers et al..... | 260/525 |
| 2,696,499 | 12/1954 | Himel............ | 260/524 |
| 2,894,985 | 7/1959 | Grantham et al. | 260/524 |
| 3,098,855 | 7/1963 | Couper et al..... | 260/525 |

OTHER REFERENCES

Perry, Chemical Engineers' Handbook, 1950, pp. 1054–1055.

Primary Examiner—Lewis Gotts
Assistant Examiner—R. S. Weissberg
Attorneys—Eugene L. Bernard, John Boustead, Martin J. Brown, Henry W. Foulds, Jr., Roger T. McLean, W. Brown Morton, Jr., John T. Roberts, N. Dale Sayre, Curt von Boetticher, Jr., McLean, Morton and Boustead, Malcolm L. Sutherland, J. Donald Tierney, Robert C. Sullivan, Daniel C. Block, Paul J. Juettner, Donald M. MacKay, Wayne C. Jaeschke, Daniel S. Ortiz, Martin Goldwasser and Vincent A. Mallare ABSTRACT: The preparation of high purity isomers of toluic acid by catalytic oxidation of the corresponding xylene isomer followed by introduction of a hot, concentrated solution of the oxidation-product to a cooled, moving slurry of the corresponding toluic acid crystals at a controlled concentration to produce supersaturation and thereafter crystallizing the desired toluic acid and recovery thereof is disclosed.

PATENTED SEP 21 1971 3,607,920
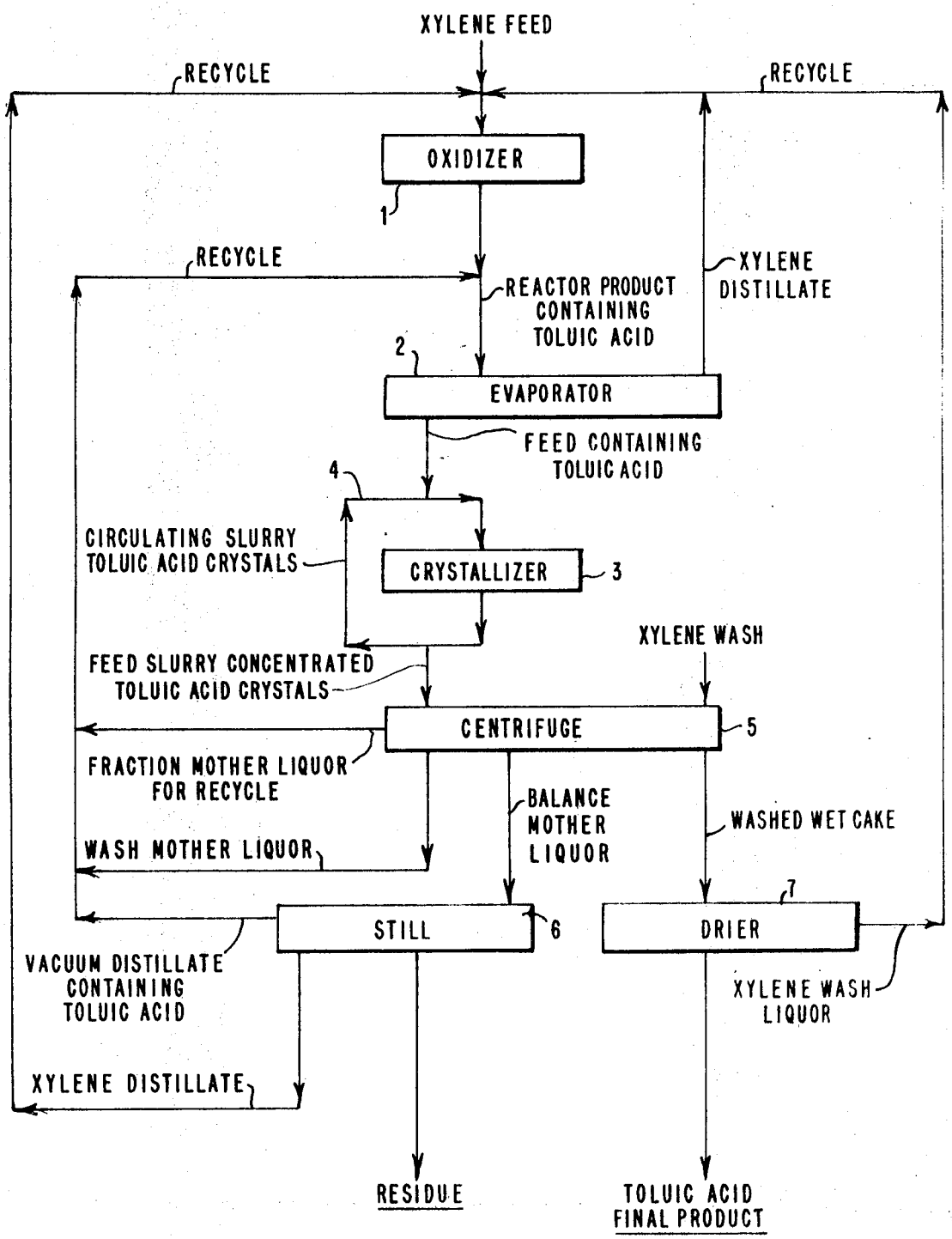
ALLAN P. CLARK
INVENTOR
BY
McLean, Morton and Boustead
ATTORNEYS

PROCESS FOR THE PREPARATION OF HIGH PURITY ISOMERS OF TOLUIC ACID

BACKGROUND OF THE INVENTION

1. Field of the Invention

My invention relates to the preparation of orthometa, or paraisomers of toluic acid. More particularly, my invention relates to the preparation of such isomers from the corresponding isomer of xylene by catalytic oxidation of xylene, followed by a separation sequence which renders the desired toluic acid in excellent yields and purity.

2. Description of the Prior Art and Problem

The preparation of toluic acid by catalytic oxidation of xylene is well known. It involves the conversion of the ortho, meta or paraxylene isomer to the corresponding toluic acid isomer by catalytic oxidation. The catalyst employed generally is cobalt. The conversion proceeeds first through methyl benzyl alcohol to methyl benzaldehyde and then to the desired toluic acid. The chemistry of the overall reaction is extremely complex because of the possibilities presented for side reactions and concomitant preparation of undesired byproducts, such as benzoic acid, dimethyl- diphenylethane and xylenols, as well as methyl benzyl toluates. These byproducts occur during the course of the catalytic oxidation to toluic acid. Furthermore, if the reaction is allowed to proceed, the toluic acids convert to the corresponding phthalic acid, isophthalic acid or terephthalic acid and anhydrides thereof, proceeding through hydroxymethylbenzoic acids and then through the corresponding phthaldehyde. In addition the acids can convert to the corresponding phthalide, in the case of orthotoluic acid from orthoxylene. Thus it can be seen that, although the catalytic oxidation is well known, stopping the reaction at the desired toluic acid stage and isolation of the toluic acid from the reaction mixture is an extremely complex task.

In the past, commercial emphasis has been directed to the preparation of the phthalic, isophthalic or terephthalic acids and anhydrides. The commercial importance of toluic acid has recently increased, however, due to its use as a raw material for the preparation of diethyltoluamide, an important insect repellent. Furthermore, orthotoluc acid is useful as an intermediate in the preparation of 3,5-Dinitro-o-toluamide, a coccidiostat. Thus, while a commercially feasible large-scale process for the preparation of high-purity toluic acids has been needed and, although the chemistry is conventional and widely known, methods for economical isolation of the desired toluic acids have not been available.

Separation of toluic acid from the complex reaction mixture to produce high-quality isomers of toluic acid has proved to be a refractory problem. For example, techniques such as aqueous extraction, distillation procedures and certain crystallization techniques have proved unsuccessful. My invention provides a solution to this problem by means of an economical and commercially feasible process.

SUMMARY OF THE INVENTION

I have now devised a novel method of producing isomers of toluic acid involving the catalytic oxidation of the corresponding xylene isomer, followed by the removal of catalyst and other solids from the resulting reaction mixture and preparation of a concentrated toluic acid solution, which is introduced into a cooled, moving slurry containing a controlled concentration of crystals of the corresponding isomer of toluic acid so as to create a supersaturated solution containing seed crystals, and recovering the desired toluic acid from the solution by crystallization. By following this procedure the desired isomer of toluic the evaporator is recovered in a highly pure, easily recoverable form in excellent yields. The process has the advantage of utilizing starting xylene as the reaction medium and provides for recovery of the xylene for recycle to result in obvious economic advantages. The process also provides for recycle of intermediate methylbenzyl alcohol and methylbenzaldehyde to increase overall yields.

DETAILED DESCRIPTION OF THE INVENTION

My process for the preparation of individual isomers of toluic acid is illustrated by the accompanying drawing which is a flow diagram of a preferred embodiment of my invention.

Referring to the drawing, oxidation of the xylene isomer feed is accomplished in oxidizing zone 1. Catalytic oxidation of xylenes, whether mixed or as the individual isomers, is well known, e.g., see U.S. Pat. Nos. 2,696,499 and 2,712,551. The process involves oxidation with air, or other oxygen-rich gas, under conditions suitable to convert the xylene isomer to the corresponding toluic acid. Generally the oxidation is carried out in the presence of a catalyst. The catalyst can be cobalt, manganese or cerium, usually as a soap, in a form soluble in the reaction mixture as, for example, the cobalt, manganese or cerium toluates or acetates. The amount of catalyst used can vary, but usually an aqueous solution of about 5 percent to about 20 percent, and preferably about 10 percent, to give a catalyst concentration of from about 0.01 percent to about 0.10 percent, and preferably 0.05 percent, usually suffices. The oxidation is usually run at a temperature ranging from about 200° F. to about 450° F., and preferably from about 310° F. to about 320° F., under liquid phase conditions, and utilizing sufficient pressure to maintain the xylene and oxidation products in liquid phase. Pressures, a function of temperature and economic factors, ranging from about 50 to about 500 pounds per square inch gauge, and preferably about 100 p.s.i.g., usually suffice. In carrying out the oxidation, conversions on percent order of about 9 to about 15 percent acid, calculated as toluic acid are effected. The reaction can be carried out in batch, continuous, or semicontinuous manner. The reaction vessel can, therefore, be an autoclave or a stirred reactor, suitable for pressure conditions, or a reaction zone, suitable for continuous processing under pressure.

The reaction mixture from the oxidizing step is washed with water to remove the oxidation catalyst. Removal of the catalyst at this stage leads, particularly in the case of the orthoisomer, to better yields and quality of product. Where meta and paraxylene is the starting material, it has been found advantageous to remove by filtration the isophthalic and terephthalic acids formed during oxidation prior to removal of catalyst. During this wash phase the oxidation product cools generally to a temperature approaching 100° F. for the ortho and metatoluic acid isomers. In the case of the paratoluic acid isomer, the temperature must be high enough to maintain the paratoluic acid in solution, the preferred temperature range is 200° to 210° F. In a preferred embodiment the aqueous-reactor product mixture is them discharged to a separator where the water is removed and discarded.

The reactor solution resulting from the oxidation of the paraxylene, after removal of catalyst and solids, is in a suitably concentrated state and need not be subjected to a concentration or evaporation step. In the case of the ortho and metaxylene isomers, however, it has been found necessary to increase the acid concentration by removal of xylene, generally in a vacuum evaporator as shown on the drawing as evaporator 2, to produce a concentrated solution of the ortho and metatoluic acid in residual xylene. The xylene distillate can be, and preferably is, recycled to the oxidizing zone 1 as shown in the drawing. It is preferred to distill at and subsequently maintain the resulting concentrated solution from the evaporator 2 at a temperature below about 200° F. to prevent color degradation. A vacuum of below about 50 mm. (Hg) is employed. Suitable toluic acid concentrations range from about 50 percent to near saturation, with a concentration of about 50 percent being preferred for the ortho and metatoluic acid isomers. In the case of the paratoluic acid isomer, the concentration range may be as low as 14 percent to near saturation.

The suitably concentrated solution of ortho, meta or paraisomer is then treated in a particular manner to recover the toluic acid isomer. I have found that careful control must be exercised in the manner of treating the concentrated solution in order to obtain high-purity toluic acid. I have found that this can be accomplished by adding the suitably concentrated solution to a cooled, moving slurry of toluic acid crystals to form a supersaturated solution of toluic acid from which the pure acid is readily crystallized. In the case of the ortho and metatoluic acid isomers, the slurry of toluic acid crystals to which the concentrated solution is added, has a concentration of from about 25 percent to about 45 percent, optimum results being obtained at a concentration of approximately 33 percent. In the case of the paratoluic acid isomer, the slurry of toluic continuously crystals to which the concentrated solution is added preferably has a concentration as low as 14 percent, but can be as high as about 45 percent.

I have found that the addition is most advantageously effected prior to introducing the reaction solution to a crystallization zone 3. As shown in the drawing, it is preferably added to a recirculating loop 4 carrying a cooled slurry of toluic acid crystals. I have also found, however, that the addition can be effected by pouring the suitably concentrated solution down the vortex of a stirred crystallizer containing toluic acid crystals of controlled concentration. The slurry in either case is moving to maximize the seed crystal contact with the toluic acid in solution and thus provide optimum conditions for crystal formation without deposit in the crystallizer walls. Introduction in any other manner results in crystal buildup upon the walls of the crystallizer resulting in clogging and shutdowns. In the preferred embodiment mentioned above, the crystallizer feed solution enters an external circulating loop and, preferably at about a 45° angle to the slurry flow. The loop discharges into an agitated crystallizer as shown by crystallizer 3. The slurry temperature is carefully controlled between 65° to 90° F., preferably being maintained at about 80° to 85° F., for example, by means of a heat exchanger in the loop.

After crystallization, the toluic acid crystals are removed, generally be filtration by means of a centrifugal filter as shown by centrifuge, 5. In the case of the ortho and metatoluic acid isomers, a portion, generally from about 1 percent to 45 percent, of the mother liquor from the filtration step is recycled to the evaporating step, 2. Another portion, from about 55 percent to about 100 percent, of the mother liquor is distilled as shown by still 6 to recover recyclable values, such as methylbenzyl alcohol and methylbenzaldehyde which are returned to the oxidizing step 1 and xylene, which preferably is recycled to the oxidizing step 1 as feed stock. In the case of the paratoluic acid isomer, a portion, preferably from 80 percent to 90 percent, of the mother liquor containing a large quantity of residual p-xylene from the filtration step is recycled to the oxidizing step 1. The balance of the mother liquor is distilled and the distillate recycled to the oxidizing step 1. I have found that a highly advantageous method of washing the crystals in the centrifuge while at the same time providing replenishment of xylene feed stock is to wash the crystals with an equivalent amount of xylene, i.e., on a 1:1 basis, recover the xylene wash liquor and return it to the oxidizing step 1 as feed, thus providing a precise, continuous processing feed control as automatically measured by product yield. Thus, the crystals in centrifuge 5 are washed with xylene, the wet cake transferred to a vacuum drier 7 from which xylene is recovered and returned as feed to the oxidizer 1 and the high purity solid isomer of toluic acid recovered.

My invention will be further illustrated by the following examples.

EXAMPLE 10

This example is of the production of orthotoluic acid. To an agitated 1,000 gallon vessel is continuously pumped 900 gallons per hour of o-xylene (6,615 pounds), 3 gallons per hour of a 10 percent aqueous cobalt acetate solution and 320 cubic feet per minute of air through a common inlet tube. The liquid phase air oxidation is controlled at 310° to 320° F. under 100 p.s.i.g. The cobalt concentration is maintained at approximately 0.05 percent. The conversion is analyzed hourly by titration. The air and o-xylene relative flows are adjusted to maintain a 12 percent to 15 percent acid content as determined by titration and calculated as toluic acid. The reactor is continuously discharged at a rate to maintain a 900 gallon capacity and the discharged mixture is continuously flowed through a heat exchanger, where it is cooled to 190° F., into a product separator. The spent air from the product separator is charged continuously through a water-cooled condenser and then released to the atmosphere. The water-xylene mixture in the condenser is conducted continuously into a decanter where the separated water is continuously discarded and the xylene returned to the air oxidizer. The spent air possesses an average 5 percent oxygen and 1.7 percent $CO_2$ content.

The product from the air oxidation is discharged continuously at approximately 900 gallons per hour into an agitated 2,000 gallon vessel where it is washed with 60 gallons per hour of water and cooled to 125° F. at atmospheric pressure to remove the catalyst. The aqueous reactor product mixture is then discharged continuously into a 2,000 gallon separator, where the separated water is discarded. The aqueous wash reduces the reactor product's cobalt content from an average of 15 p.p.m. to 1 p.p.m.

The reactor product is drawn into an agitated 2,000 gallon evaporator at approximately 900 gallons per hour to adjust the acid concentration. The acid concentration is increased to approximately 50 percent by continuously distilling off o-xylene at 190° F. under 50 mm.(Hg.). This o-xylene distillate is recycled to the air oxidizer. The concentrated reactor product is pumped continuously at a 15 pound per hour rate to a crystallizer.

The crystallizer feed solution enters an external circulating loop, containing a circulating slurry of about 33⅓% o-toluic acid crystals, at a 45° angle to the slurry flow. The circulating loop flows out of and discharges into an agitated 2,000 gallon crystallizer. The slurry temperature is maintained at 80° to 85° F. by pumping the slurry at a 1,000 gallons per minute rate through a heat exchanger in the circulating loop.

The centrifuge slurry feed is a small circulating loop off the crystallizer cooling loop. The centrifuge discharges approximately a 70 pound o-xylene washed wet o-toluic acid cake 12 times an hour. The ratio of o-xylene wash to wet cake is 1 to 1. The main portion of the fresh o-xylene replacement feed to the system enters as a centrifuge cake wash. The washed centrifuge cake is fed to a drier feed bin. The vacuum drying is a batch process and discharges an average load of 4,000 pounds of 98.8 to 99.2 percent pure o-toluic acid per batch. The o-xylene distillate removed from the drier, which operated under 25 mm.(Hg) to maximum temperature of 175° F., is recycled to the air oxidizer.

The mother liquor from the centrifuge is split into a 25 percent recycle stream to the evaporator, described in step C, and a 75 percent stream to a still. The atmospheric distillate collected from the still, at a pot temperature of 375° F., is recycled to the air oxidizer. The remaining pot residue is stripped of the remaining o-xylene, o-tolualdehyde, o-tolubenzyl alcohol and a part of the o-toluic acid content at a maximum pot temperature of 375° F. under 50 mm.(Hg). This vacuum distillate is recycled to the evaporator The pot residue is discharged as waste.

EXAMPLE 2

This example is of the production of metatoluic acid. To an agitated 1,000 gallon vessel is continuously pumped 900 gallons per hour of m-xylene (6,485 pounds), 3 gallons per hour of a 10 percent aqueous cobalt acetate solution and 320 cubic feet per minute of air through a common inlet tube. The liquid phase air oxidation is controlled at 310° to 320° F. under 100 p.s.i.g. The cobalt concentration is maintained at approximately 0.05 percent. The conversion is analyzed hourly by titration. The air and m-xylene relative flows are adjusted to maintain a 12 percent to 15 percent acid content as determined by titration and calculated as toluic acid. The reactor is continuously discharged at a rate to maintain a 900 gallon capacity and the discharged mixture is continuously flowed through a heat exchanger, where it is cooled to 190° F., into a product separator. The spent air from the product separator is charged continuously through a water cooled condenser and then released to the atmosphere. The water-xylene mixture in the condenser is conducted continuously into a decanter where the separated water is continuously discarded and the xylene returned to the air oxidizer. The spent air possesses an average 5 percent oxygen and 1.7 percent $CO_2$ content.

The product from the air oxidation is discharged continuously at approximately 900 gallons per hour into an agitated 2,000 gallon vessel where it is washed with 60 gallons per hour of water and cooled to 125° F. at atmospheric pressure to remove the catalyst. The aqueous reactor product mixture is then discharged continuously into a 2,000 gallon separator, where the separated water is discarded. The aqueous wash reduces the reactor product's cobalt content from an average of 15 p.p.m. to 1 p.p.m.

The reactor product is drawn into an agitated 2,000 gallon evaporator at approximately 900 gallons per hour to adjust the acid concentration. The acid concentration is increased to approximately 50 percent by continuously distilling off m-xylene at 190° F. under 50 mm.(Hg). This m-xylene distillate is recycled to the air oxidizer. The concentrated reactor product is pumped continuously at a 15 pound per hour rate to a crystallizer.

The crystallizer feed solution enters an external circulating loop, containing a circulating slurry of about 33⅓% m-toluic acid crystals, at a 45° angle to the slurry flow. The circulating loop flows out of and discharges into an agitated 2,000 gallon crystallizer. The slurry temperature is maintained at 80° to 85° F. by pumping the slurry at a 1,000 gallons per minute rate through a heat exchanger in the circulating loop.

The centrifuge slurry feed is a small circulating loop off of the crystallizer cooling loop. The centrifuge discharges approximately a 70 pound m-xylene washed wet m-toluic acid cake 12 times an hour. The ratio of m-xylene wash to wet cake is 1 to 1. The main portion of the fresh m-xylene replacement feed to the system enters as a centrifuge cake wash. The washed centrifuge cake is fed to a drier feed bin. The vacuum drying is a batch process and discharges an average load of 4,000 pounds of 95.7 percent to 96.2 percent pure m-toluic acid per batch. The m-xylene distillate removed from the drier, which operated under 25 mm.(Hg) to maximum temperature of 175° F., is recycled to the air oxidizer.

The mother liquor from the centrifuge is split into a 45 percent recycle stream to the evaporator, described in step C, and a 55 percent stream to a still. The atmospheric distillate collected from the still, at a pot temperature of 375° F., is recycled to the air oxidizer. The remaining pot residue is stripped of the remaining m-xylene, m-tolualdehyde, m-tolubenzyl alcohol and a part of the m-toluic acid content at a maximum pot temperature of 375° F. under 50 mm.(Hg). This vacuum distillate is recycled to the evaporator. The pot residue is discharged as waste.

EXAMPLE 3

This example is of the production of paratoluic acid. To an agitated 1,000 gallon vessel is continuously pumped 900 gallons per hour of p-xylene (6,463), 3 gallons per hour of a 10 percent aqueous cobalt acetate solution and 320 cubic feet per minute of air through a common inlet tube. The liquid phase air oxidation is controlled at 310° to 320° F. under 100 p.s.i.g. The cobalt concentration is maintained at approximately 0.05 percent. The conversion is analyzed hourly by titration. The air and p-xylene relative flows are adjusted to maintain a 12 percent to 15 percent acid content as determined by titration and calculated as toluic acid. The reactor is continuously discharged at a rate to maintain a 900 gallon capacity and the discharged mixture is continuously flowed through a heat exchanger, where it is cooled to 212° F., into a product separator. The spent air from the product separator is charged continuously through a water-cooled condenser and then released to the atmosphere. The water-xylene mixture in the condenser is conducted continuously into a decantor where the separated water is continuously discarded and the xylene returned to the air oxidizer. The spent air possesses an average 5 percent oxygen and 1.7 percent $CO_2$ content.

The product from the air oxidation is discharged continuously at approximately 900 gallons per hour into an agitated 2,000 gallon vessel where it is washed with 60 gallons per hour of water and cooled to 210° F. at atmospheric pressure to remove the catalyst The aqueous reactor product mixture is then discharged continuously into a 2,000 gallon separator, where the separated water is discarded. The aqueous wash reduces the reactor product's cobalt content from am average of 15 p.p.m. to 1 p.p.m.

The reactor product is pumped continuously at a 6,747 pound per hour rate to a crystallizer.

The crystallizer feed solution enters an external circulating loop, containing a circulating slurry of o-toluic acid crystals, at a 45° angle to the slurry flow. The circulating loop flows out of and discharges into an agitated 2,000 gallon crystallizer. The slurry temperature is maintained at 80° to 85° F. by pumping the slurry at a 1,000 gallons per minute rate through a heat exchanger in the circulating loop.

The centrifuge slurry feed is a small circulating loop off of the crystallizer cooling loop. The centrifuge discharges approximately a 70 pound p-xylene washed wet p-toluic acid cake 12 times an hour. The ratio of p-xylene wash to wet cake is 1 to 1. The main portion of the fresh p-xylene replacement feed to the system enters as a centrifuge cake wash. The washed centrifuge cake is fed to a drier feed bin. The vacuum drying is a batch process and discharges an average load of 4,000 pounds of 98.2 to 99.1 percent pure p-toluic acid per batch. The p-xylene distillate removed from the drier, which operated under 25 mm.(Hg). to maximum temperature of 175° F., is recycled to the air oxidizer.

The mother liquor from the centrifuge is split into an 80 percent recycle stream to the air oxidizer and a 20 percent stream to a still. The atmospheric distillate collected from the still, at a pot temperature of 375° F., is recycled to the air oxidizer. The pot residue is discharged as waste.

I claim:

1. A process for the preparation of orthotoluic acid which comprises oxidizing orthoxylene with an oxygen-containing gas in the presence of a catalyst, concentrating the resultant solution of orthotoluic acid, introducing the hot, concentrated solution to a cooled, moving slurry of orthotoluic acid crystals, at a concentration of about 25 percent to about 45 percent, to produce a supersaturated solution, crystallizing orthotoluic acid from the resulting solution, recovering said orthotoluic acid crystals and recycling the resulting solution to be concentrated.

2. The method of claim 1 in which the hot, concentrated solution is added to a recirculating stream of the toluic acid slurry.

3. A process for the preparation of metatoluic acid which comprises oxidizing metaxylene with an oxygen-containing gas in the presence of a catalyst, concentrating the resultant solution of metatoluic acid, introducing the hot, concentrated solution to a cooled, moving slurry of metatoluic acid crystals, at a concentration of about 25 percent to about 45 percent, to produce a supersaturated solution, crystallizing metatoluic acid from the resulting solution, recovering said metatoluic acid crystals and recycling the resulting solution to be concentrated.

4. The method of claim 3 in which the hot, concentrated solution is added to a recirculating stream of the toluic acid slurry.

5. A process for the preparation of paratoluic acid which comprises oxidizing paraxylene with an oxygen-containing gas in the presence of a catalyst, introducing the resulting hot, concentrated solution to a cooled, moving slurry of paratoluic acid crystals, at a concentration of about 14 percent to about 45 percent, to produce a supersaturated solution, crystallizing paratoluic acid from the resulting solution, recovering said paratoluic acid crystals and recycling the resulting solution to be concentrated.

6. The method of claim 5 in which the hot, concentrated solution is added to a recirculating stream of the toluic acid slurry.